United States Patent [19]

Wilson

[11] 4,397,879
[45] Aug. 9, 1983

[54] APPARATUS FOR AND METHOD OF MAKING FUNNEL CAKES

[76] Inventor: Warren Wilson, 55 Saddle River Rd., Woodcliff Lake, N.J. 07675

[21] Appl. No.: 398,233

[22] Filed: Jul. 14, 1982

[51] Int. Cl.³ .................... B65D 85/00; B65D 47/06; B65D 47/14; A21D 10/04
[52] U.S. Cl. ............................... 426/115; 220/85 SP; 222/215; 222/543; 426/128; 426/394; 426/552; 426/440; 426/496
[58] Field of Search ............... 426/112, 115, 120, 394, 426/128, 106, 117, 402; 222/215, 543; 220/85SP

[56] References Cited

U.S. PATENT DOCUMENTS

| | | | |
|---|---|---|---|
| 2,500,639 | 3/1950 | Lermer | 222/215 |
| 2,533,807 | 10/1950 | Wakefield | 426/115 |
| 2,757,824 | 8/1956 | Savary | 222/543 |
| 2,800,269 | 7/1957 | Smith | 426/115 |
| 2,918,377 | 12/1959 | Hurley et al. | |
| 2,980,540 | 4/1961 | Turpin | 426/115 |
| 3,083,858 | 4/1963 | Biedenstein | 220/265 |
| 3,187,966 | 6/1965 | Klygis | 220/265 |
| 3,194,185 | 7/1965 | Spinosa | 426/115 |
| 3,282,412 | 11/1966 | Corella et al. | 426/115 |
| 3,282,478 | 11/1966 | Russell | 222/543 |
| 3,486,503 | 12/1969 | Porter et al. | 222/215 |
| 3,513,886 | 5/1970 | Easter et al. | 426/115 |
| 3,542,190 | 11/1970 | Keller | 426/115 |
| 3,730,376 | 5/1973 | Wood | 222/543 |
| 4,230,238 | 10/1980 | Wilson | D7/50 |
| 4,282,986 | 8/1981 | Ekenstam et al. | 222/215 |

FOREIGN PATENT DOCUMENTS

| | | | |
|---|---|---|---|
| 704569 | 3/1965 | Canada | 426/115 |
| 551539 | 3/1956 | Italy | 222/543 |
| 553068 | 5/1943 | United Kingdom . | |
| 796499 | 6/1958 | United Kingdom | 426/128 |
| 810531 | 3/1959 | United Kingdom | 426/128 |

OTHER PUBLICATIONS

Modern Packaging, 7/68, vol. 41, No. 7A.
Meat & Food Merchandising, 1/57, p. 73.
Food Engineering, 11/57, p.74,75.
Food Engineering 12/55, p. 167.

Primary Examiner—Steven L. Weinstein
Attorney, Agent, or Firm—Lowe, King, Price & Becker

[57] ABSTRACT

A squeeze bottle contains a dry funnel cake mix, an opening and a selectively removable and replaceable cover for the opening. A funnel integral with the cover extends from the remainder of the bottle. With the cover removed from the opening, water is poured through the opening. The liquid and mix in the bottle are mixed by shaking the bottle to form a funnel cake batter while the cover and funnel are closed so the contents of the bottle can not escape during mixing. Then, while the funnel is open, the batter is dispensed through the funnel into a cooking vessel having heated cooking oil therein. The batter is dispensed by holding the bottle so an open end of the funnel remote from the remainder of the bottle is in a generally downward direction while the bottle is squeezed to exert pressure on the batter. A cap for the open end of the funnel is placed on the funnel open end to close the funnel after the batter has been dispensed to enable remaining batter in the bottle to be stored.

16 Claims, 7 Drawing Figures

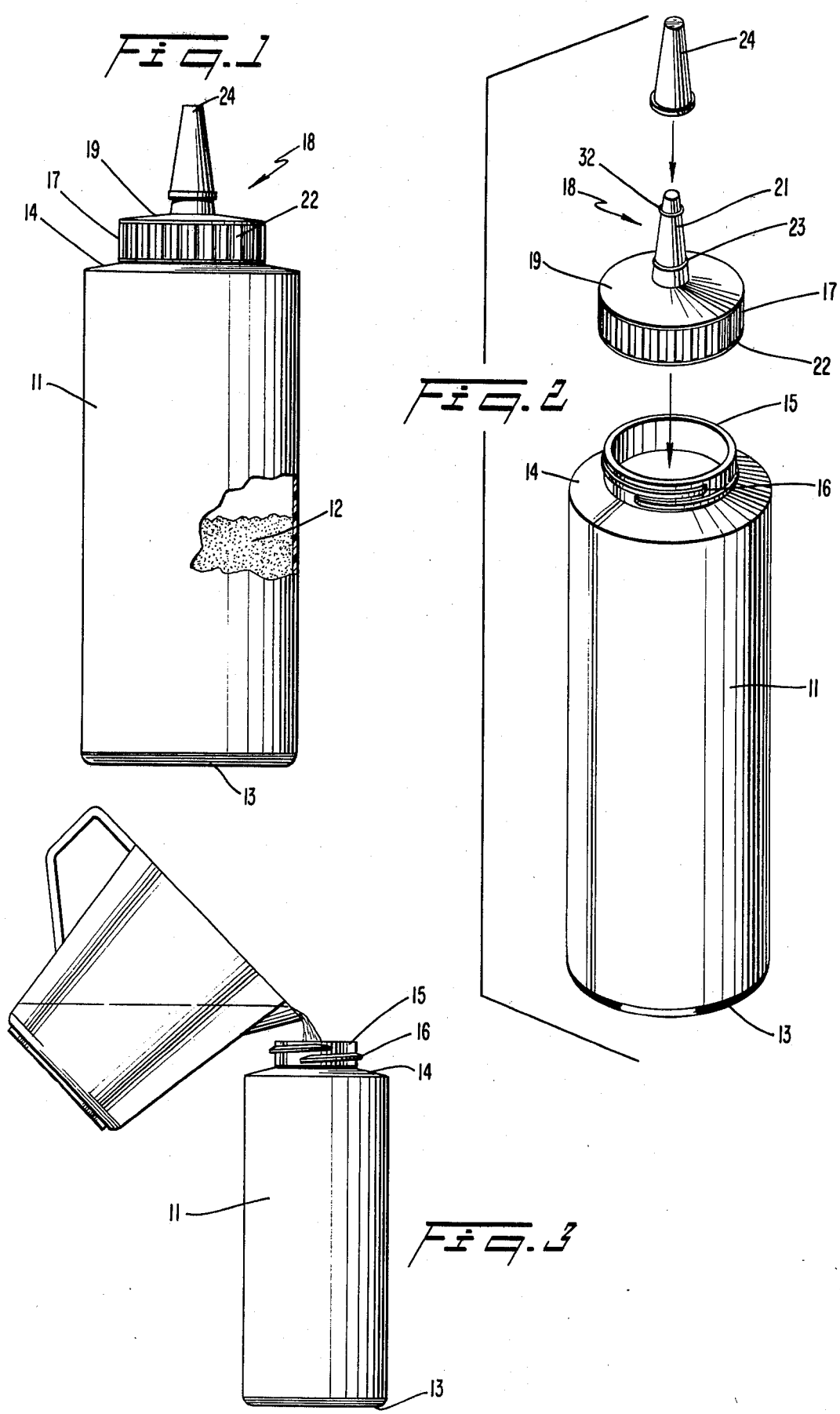

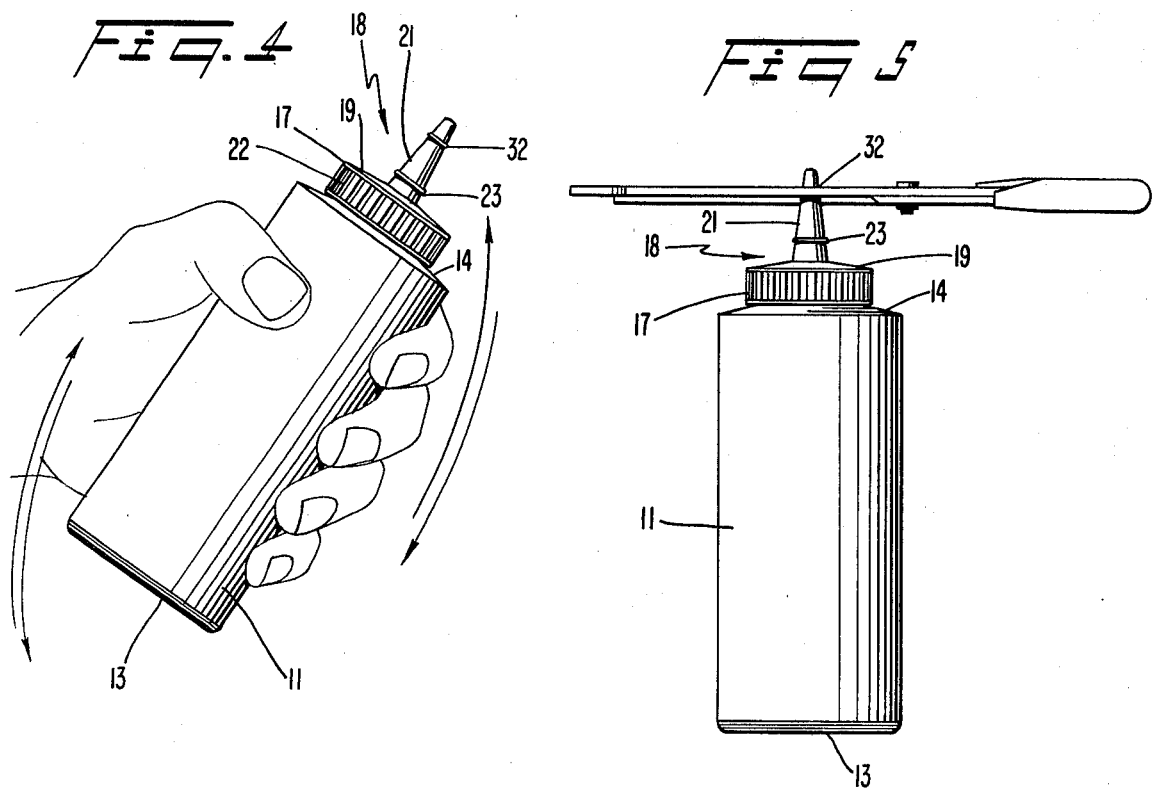
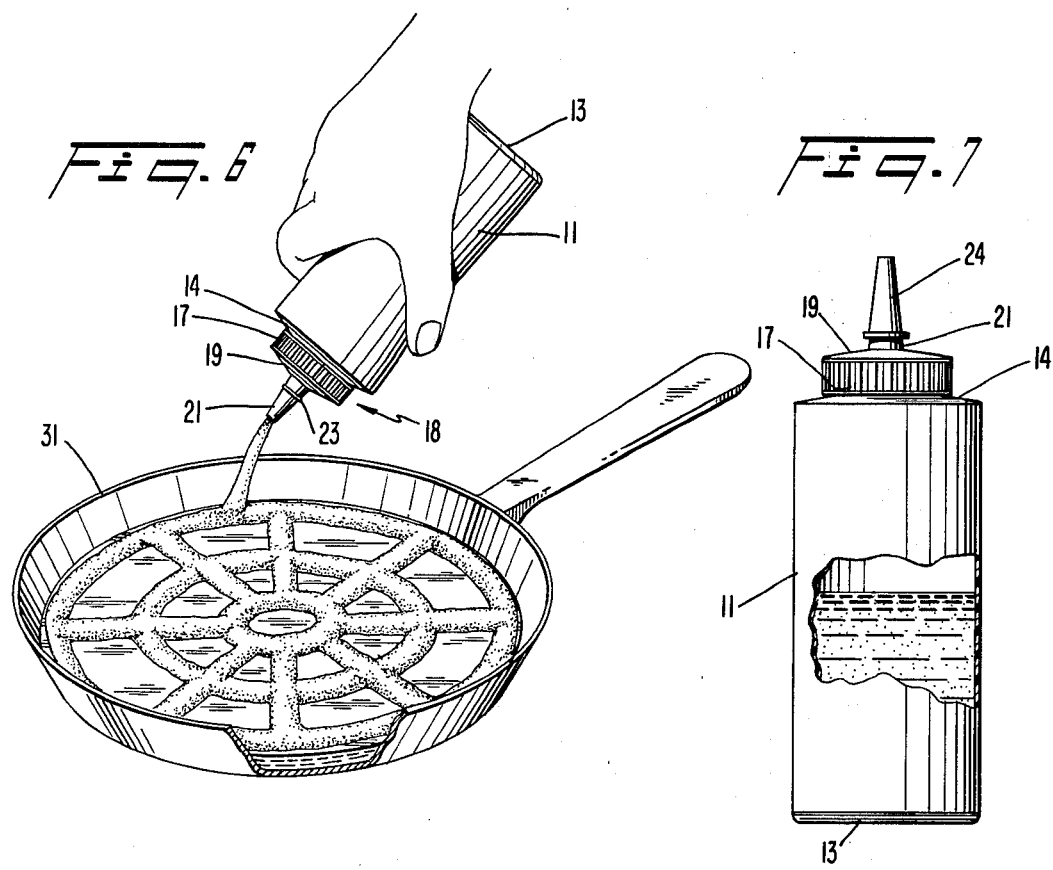

APPARATUS FOR AND METHOD OF MAKING FUNNEL CAKES

TECHNICAL FIELD

The present invention relates generally to a method of and apparatus for cooking funnel cakes, and more particularly to such a method and apparatus wherein liquid is added to a squeeze bottle containing funnel cake mix.

BACKGROUND ART

Funnel cakes are a Pennsylvania Dutch bakery confectionary, traditionally formed by a home maker pouring a batter including wheat flour, eggs, milk, leavening, salt and other materials into a skillet containing heated cooking oil. As the batter is dispensed through the funnel, the funnel is moved over the skillet, in any desired free form, to form an interlocking design, such as a spiral, star or web. The batter, as it cooks, swells to form a relatively flat cake, which is cooked on each side for approximately thirty seconds until it is evenly browned. The resulting funnel cake is removed from the skillet and frequently confectioner's sugar, syrup, ice-cream or other materials are added.

Funnal cakes, with expanding popularity, have been commercialized into dry mix form. The dry mix typically includes wheat flour, sugar, dried whole egg, non-fat dry milk, leavening, salt and artifical flavor, but does not include yeast nor shortening. To the dry mix is added a measured quantity of water or other suitable, similar liquid. The dry mix-water mixture is mixed to form a batter that can be dispensed into the skillet by utilizing a funnel. In addition, the batter can be formed in and dispensed from a pitcher having a long spout into a skillet or other cooking vessel containing heated cooking oil; a particularly suitable pitcher is disclosed in my patent Number 4,230,238. The funnel cake product has been cooked and sold in this manner at retail. In addition, the mix and pitcher have been sold at retail, for home preparation and consumption. However, the popularity of the products sold for home consumption has not been nearly as great as the popularity of the retail, cooked product, apparently because of the cost of the pitcher and perceived difficulties in forming and dispensing the batter.

It is, accordingly, an object of the present invention to provide a new and improved apparatus for and method of enabling funnel cakes to be cooked, particularly in the household situation.

Another object of the invention is to provide a new and improved method of and apparaus for dispensing a batter formed of funnel cake mix and a liquid into a cooking vessel containing heated cooking oil.

Still another object of the present invention is to provide a new and improved relatively inexpensive method of and apparatus for making funnel cakes from dry funnel cake mix stored in a convenient to use container from which a batter of the mix can be dispensed into a cooking vessel having heated cooking oil therein.

DISCLOSURE OF THE INVENTION

In accordance with the present invention, a squeeze bottle contains a non-yeast dry funnel cake mix. The squeeze bottle includes an opening. A selectively removable and replaceable cover for the opening enables a liquid, such as water, to be poured into the bottle when the cover is removed from the opening and a batter formed by the mix and the liquid. With the cover closed, the batter is shaken to form the batter without escape of the mix and liquid from the bottle. The bottle includes means adapted to form a spout for enabling batter formed in the bottle to be dispensed from the bottle. The spout is closed while the liquid is being shaken in the bottle and is opened to enable the batter to be dispensed through it from the bottle. The spout, bottle, and batter are made of materials and arranged such that the batter flows without substantially sticking to the spout or bottle when the bottle is squeezed and held so that the spout is below the batter and pointed toward heated cooking oil in a skillet. It has been experimentally found that for a dry non-yeast mix, the non-sticking characteristics are provided by a cylindrical squeeze bottle and spout made of polyethylene. If the mixture contains yeast it will stick to the bottle and not be efficiently dispensed through the spout.

The spout is shaped as a funnel extending from and integral with the cover. The funnel has tapered sides to provide sufficient flow impedance to batter flowing through the funnel to provide controlled dispensing of the batter from the bottle. If the batter included yeast it would clog the funnel to prevent dispensing of batter.

In the preferred configuration, the bottle has a generally cylindrical shape with a generally flat end face and a diameter enabling a human hand to firmly hold and easily squeeze it. The opening is in an end face of the bottle opposite from the generally flat end face. The funnel has a longitudinal axis coincident with a longitudinal axis of the cylindrical shape, to facilitate dispensing and manufacture.

The controlled dispensing of batter from the funnel is provided with a funnel having a frusto conical wall. To facilitate storage of remaining batter in the squeeze bottle, the cap for the funnel has an interior tapered wall mating with the tapered frusto conical wall so the cap is frictionally held in situ on the frusto conical wall. To enhance the frictional fit between the cap and the funnel, a very small ring is formed on the exterior of the funnel.

The spout is initially formed as an integral conical member on the cover. The integral conical member initially has a closed end remote from the opening in the bottle through which water is poured. A ring adjacent the closed end provides a marker for the location where the integral conical member is cut to form the open funnel end. The inner diameter of the open funnel end is approximately one-eighth inch, a diameter which has been found to provide desirable results for the size of strands in the formed, cooked funnel cake and which assists in the controlled dispensing.

It has been found that the non-yeast mix has a tendency to stratify when stored in the bottle for a extended period. The stratification has adverse effects on the uniformity of the batter and the finished product. These adverse effects are obviated by shaking the bottle immediately prior to addition of liquid.

It is still another object of the present invention to provide a new and improved method of and apparatus for making funnel cakes by utilizing a squeeze bottle having a spout, wherein batter in the bottle is easily dispensed from the bottle through the spout in a controlled manner, without substantial sticking to the bottle or spout.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is a side elevation view of a container and a dry mixture of funnel cake mix, in accordance with the present invention;

FIG. 2 is an exploded prospective view of the container and mix illustrated in FIG. 1; and FIGS. 3-7 are illustrations of the sequence of steps for performing the method of the invention, wherein FIG. 3 is an illustration of water being poured into the container illustrated in FIGS. 1 and 2, FIG. 4 is an illustration of the mixing operation to form the batter within the container of FIGS. 1 and 2, FIG. 5 is an illustration of cutting a cone to form an open end of the funnel, FIG. 6 is an illustration of batter being poured into a skillet, and FIG. 7 is an illustration of the bottle and batter for storage.

BEST MODE FOR CARRYING OUT THE INVENTION

Reference is now made to FIGS. 1 and 2 of the drawing wherein there is illustrated a cylindrical, plastic, squeeze bottle 11, approximately two-thirds of which is filled with a non-yeast dry mixture of flour and other edible cake mix particulate materials forming funnel cake mix; preferably, the dry mixture weighs five ounces and includes wheat flour, sugar, dried whole egg, non-fat dry milk, salt, artificial flavoring and leavening in the form of: sodium acid pyrophosphate, sodium bicarbonate. Bottle 11 has a diameter of approximately two inches and a height, between relatively flat, bottom face 13 and upper face 14, of approximately five and a half inches, to facilitate holding and squeezing thereof by a human hand.

Top face 14 includes a central circular opening sufficiently large, e.g., two inches in diameter, to enable a measured amount of water to be poured into it. Extending from the circumference of the opening and integral with top face 14 is cylindrical flange 15, having threads 16 on the exterior thereof. Flange 15 and threads 16 are screwed to threads on ring 17 of plastic cover 18. Cover 18 includes end face 19 that extends inwardly from ring 17. In the center of face 19, and extending away from the remainder of bottle 11 is cone 21, having a longitudinal axis coincident with the longitudinal axis of bottle 11. Ring 17 includes longitudinally extending ribs 22, which provide structural strength to cover 18. Additional structural strength for the cover is provided by beveling face 19 upwardly and away from the upper edge of ring 17. The upper tip of cone 21, remote from the remainder of bottle 11, is closed so that when cover 18 is screwed onto flange 16 a relatively moisture proof seal is provided for dry mixture 12 within bottle 11.

Cover 18 is integrally formed from one piece of polyethylene that is easily cut by scissors, or the like, along horizontal ring 32, located just below the tip of cone 21, to serve as a mark where cone 21 is to be cut. Cone 21 includes a further ring 23, located in proximity to, but above, face 19. Ring 23 frictionally captures frusto conical, plastic cap 24, having an interior which mates with the exterior of cone 21. After cone 21 has been snipped at ring 32, cap 24 can be held in situ on the cone because of a frictional nesting relationship between the interior surface of cap 24 and the exterior surface of cone 21 and the frictional contact between outwardly extending ring 23 and the interior of the cap.

Bottle 11 and cover 18 are made of polyethylene, a material such that when non-yeast mix 12 is formed into a batter, by the addition of water, the batter flows without substantially sticking to the surfaces of bottle 11 or cover 18. To provide sufficient flow impedance to batter flowing through the funnel formed by snipping cone 21 at ring 32 and thereby provide controlled dispensing of batter from bottle 11, the frusto conical element formed by snipping cone 21 at ring 32 has an opening with an inner diameter of approximately one-eighth inch, a diameter at the intersection of the base of the frustumed cone with face 19 of three-eighths inch, and a height between the intersection of the frustumed cone and face 19 to ring 32 of approximately seven-eighths inch.

The method of making funnel cakes in accordance with the present invention is now described in connection with FIGS. 3-7. Immediately prior to cover 18 being removed from bottle 11 and the bottom face 13 of the bottle being placed on a counter, the bottle is shaken to mix the dry ingredients therein so that the ingredients are homogeneously mixed to overcome a tendency for the ingredients to stratify while stored in the bottle. Then, with cover 18 removed, water is poured through the opening at the top of bottle 11. For five ounces of funnel cake mix, one-half cup of cold water is added. Then, cover 18 is screwed onto flange 15, to prevent escape of the contents of bottle 11. Bottle 11 is then grasped by the hand of the chef and the contents of the bottle are mixed, by shaking the bottle for approximately thirty seconds, as illustrated in FIG. 4.

After the cake mix-water mixture in bottle 11 has been thoroughly mixed by shaking to form the funnel cake batter, cover 18 is snipped, by scissors, along ring 32, as illustrated in FIG. 5. The batter is then dispensed through the funnel formed by snipping cover 18 at ring 32 so an open end of the funnel remote from the remainder of bottle 11 is in a generally downward direction. With the open end of the funnel formed in cover 18 in a downward direction, hand pressure is applied to the cylindrical walls of bottle 11, to squeeze the walls and exert pressure on the batter. Batter is therefore dispensed into a cooking vessel, in the form of relatively shallow skillet 31, containing heated cooking oil, as illustrated in FIG. 6. Typically, the heated cooking oil is vegetable shortening, one-half deep in a five inch skillet. The shortening is heated to 375°, a temperature which enables a drop of the batter to flow to the surface and brown in fifteen seconds. While bottle 11 is being squeezed, to dispense batter through the opening formed at ring 32, the bottle is moved over the heated cooking oil in free form, to form strands of an interlocking design, such as a spiral, star or web. The entire surface areas of skillet 31 should not be filled because the batter expands as it cooks. If it is desired to make the strands thicker, cover 18 is cut below ring 32 and above ring 23; however it has been found that cap 24 does not stay in situ as well if cover 18 is cut below ring 32 and that fewer funnel cakes can be made from a single bottle.

The batter forms a relatively thin cake in the heated cooking oil. When the edges of the cake becomes brown, after approximately thirty seconds of cooking, the cake is turned over and is cooked for another twenty seconds, until evenly browned. After the cake has been cooked, it is removed from the skillet, allowing excess shortening to drip back into the skillet. The cake is then served, with confectioner's sugar, ice-cream, syrup and/or cinnamon sugar, or other confectionary products. With the specified amount of mix and water, eight servings are provided.

In many instances, eight servings exceed the requirements for a particular meal and it is desired to store the batter. The batter is stored by covering the opening of the funnel formed by snipping cone 21 at ring 32 with cap 24, as illustrated in FIG. 7. The contents can be stored in a refrigerator for several days or in a freezer for up to six months. When it is desired to make additional funnel cake with the residual batter in squeeze bottle 11, the batter in the bottle is again mixed by shaking bottle 11 with cap 24 on cover 18. Cap 24 is then removed and batter dispensed through the funnel formed in cone 21, as described supra.

While there has been described and illustrated one specific embodiments of the invention, it will be clear that variations in the details of the embodiment specifically illustrated and described may be made without departing from the true spirit and scope of the invention as defined in the appended claims. For example the dimensions can be changed.

I claim:

1. In combination, a squeeze bottle, a dry, non-yeast, non-shortening funnel cake mix of particulate materials in the bottle, the funnel cake mix including wheat flour, sugar, dried egg, dry milk, leavening and salt, an opening in the bottle, a selectively removable and replaceable cover for the opening, the cover when removed from the opening enabling a liquid to be poured into the bottle and, when placed on the opening, enabling a batter formed by the mixture and the liquid to be shaken without escape from the bottle, means adapted to form a spout for enabling batter formed in the bottle to be dispensed from the bottle, the spout being closed while the liquid is being shaken in the bottle and being opened to enable the batter to be dispensed through it from the bottle, the spout being shaped as a funnel extending from and integral with the cover to provide sufficient flow impedance to batter flowing through the funnel to enable controlled dispensing of the batter from the bottle when the bottle is squeezed and the funnel end is below the batter, the spout, bottle and batter being made of materials and being arranged such that the batter flows through the spout without substantially sticking to the spout or bottle when the bottle is squeezed and the spout is below the batter.

2. The combination of claim 1 wherein the bottle and spout are made of polyethylene.

3. The combination of claim 2 wherein the bottle has a generally cylindrical shape with a generally flat, bottom end face and a diameter enabling a hand to firmly hold and easily squeeze it, the opening being in an end face if the bottle opposite from the generally flat, bottom end face, the funnel having a longitudinal axis coincident with a longitudinal axis of the cylindrical shape.

4. The combination of claim 3 further including a cap for the funnel.

5. The combination of claim 4 wherein the funnel has a tapered frusto conical wall and the cap has an interior tapered wall mating with the tapered frusto conical wall so the cap is frictionally held in situ on the frusto conical wall.

6. The combination of claim 1 wherein the bottle has a generally cylindrical shape with a generally flat, bottom end face and a diameter enabling a hand to firmly hold and easily squeeze it, the opening being in an end face of the bottle opposite from the generally flat, bottom end face, the funnel having a longitudinal axis coincident with a longitudinal axis of the cylindrical shape.

7. The combination of claim 6 further including a cap for the funnel.

8. The combination of claim 7 wherein the funnel has a tapered frusto conical wall and the cap has an interior tapered wall mating with the tapered frusto conical wall so the cap is frictionally held in situ on the frusto conical wall.

9. A method of making funnel cakes with a squeeze bottle containing: a dry non-yeast, non-shortening funnel cake mix, the funnel cake mix including wheat flour, sugar, dried egg, dry milk, leavening and salt, an opening, a selectively removable and replaceable cover for the opening, and means adapted to form a spout for contents in the bottle, the spout being formed as a funnel extending from the cover, said method comprising:
    (a) removing the cover,
    (b) then pouring liquid through the opening,
    (c) then mixing the mix with the liquid to form a batter of the mix, the mixing being performed while the cover and spout are closed so the contents of the bottle can not escape during mixing, and
    (d) then while the spout is open dispensing the batter through the spout into a cooking vessel having heated cooking oil therein, the batter being dispensed through the funnel by holding the bottle so an open end of the funnel remote from the remainder of the bottle is in a generally downward direction below the batter while the bottle is squeezed to exert pressure on the batter.

10. The method of claim 9 wherein the bottle is provided with a cap for the open end of the funnel, the method further comprising placing the cap on the funnel open end to close the funnel after a portion of the batter has been dispensed, and then storing the batter in the bottle with the cover on the bottle and the cap closing the funnel.

11. The method of claim 10 wherein the spout is initially formed as an integral conical member having a closed end remote from the opening, the closed end staying closed during steps (a), (b) and (c), and prior to step (d) cutting the integral conical member to form the open end of the funnel.

12. The method of claim 11 further including shaking the bottle immediately prior to step (a) to mix the mix therein and overcome stratification of the mix as is likely to occur during storage prior to step (a).

13. The method of claim 9 wherein the liquid and mix are mixed during the mixing step by shaking the bottle.

14. The method of claim 9 or 13 further including storing the batter in the bottle with the cover on the opening and the spout closed.

15. The method of claim 14 further including shaking the bottle immediately prior to step (a) to mix the mix therein and overcome stratification of the mix as is likely to occur during storage prior to step (a).

16. The method of claim 9, 10 or 13 further including shaking the bottle immediately prior to step (a) to mix the mix therein and overcome stratification of the mix as is likely to occur during storage prior to step (a).

* * * * *